United States Patent [19]

Demke et al.

[11] 4,314,244

[45] Feb. 2, 1982

[54] MULTIPLE HEIGHT PROPORTIONED CHARACTER GENERATION

[75] Inventors: Kent R. Demke, Austin; Jerold D. Dwire, Round Rock; Michael A. Ko; Joanne L. Mumola, both of Austin, all of Tex.

[73] Assignee: International Business Machines Corporation, Armonk, N.Y.

[21] Appl. No.: 159,558

[22] Filed: Jun. 16, 1980

[51] Int. Cl.[3] .......... G06F 3/153

[52] U.S. Cl. .......... 340/731; 340/748; 340/803

[58] Field of Search .......... 340/731

[56] References Cited

U.S. PATENT DOCUMENTS

| | | | |
|---|---|---|---|
| 4,090,188 | 5/1978 | Suga | 340/731 |
| 4,107,664 | 8/1978 | Marino | 340/731 |
| 4,107,786 | 8/1978 | Masaki et al. . | |
| 4,129,860 | 12/1978 | Yonezawa et al. . | |
| 4,168,489 | 9/1979 | Ervin . | |

OTHER PUBLICATIONS

Boyd et al., "Text Editing Display System with Vertical Expansion of Selected Lines for Highlighting", IBM Tech. Discl. Bul., vol. 21, No. 11, Apr. 1979, pp. 4339, 4340.

Holderness, "Generation of Double Size Characters", IBM Tech. Discl. Bul., vol. 13, No. 9, Feb. 1971, pp. 2792, 2793.

*Primary Examiner*—David L. Trafton
*Attorney, Agent, or Firm*—Douglas H. Lefeve

[57] ABSTRACT

A system and method for generating properly proportioned alphanumeric characters and symbols in two vertical heights with a single character generator and a minimum of associated circuitry. The bits of video data stored in the character generator are stored such that the vertical segments of diagonal portions of the characters and symbols include no more than two bits per vertical segment of the diagonal portion. The video data bits representative of the pels of circular portions of the symbols are stored in an arrangement to generate a horizontally elongated elliptical shape when the character or symbol is displayed in the shorter of the two heights. Whenever possible, the diagonal portions of characters include no more than two diagonally disposed pels in the single high character size. For representation of a single dot portion of one of the characters or symbols, a pair of video data bits is stored to generate a pair of horizontally disposed pels on the display when the character or symbol is displayed in the shorter of the two vertical heights. Translation logic is described to efficiently provide for two sizes of characters with a minimum of additional hardware and with no additional character generator memory beyond that required for the smallest characters or symbols.

10 Claims, 19 Drawing Figures

MULTIPLE HEIGHT PROPORTIONED CHARACTER GENERATION

DESCRIPTION

TECHNICAL FIELD

This invention relates to an apparatus and method for forming characters and symbols from picture elements in the form of matrices. More specifically, this invention is primarily directed to a technique for substantially increasing the height of a displayed character in a properly proportioned manner while utilizing the same character generator memory that is required for display of the characters and symbols in their shortest heights.

BACKGROUND ART

(Prior Art Statement)

Representative of the closest known prior art is IBM *Technical Disclosure Bulletin*, Vol. 13, No. 9, pages 2792–93 (February 1971), entitled "Generation of Double Size Characters," by C. J. Holderness; U.S. Pat. No. 4,129,860 to S. Yonezawa, filed Sept. 13, 1976 (priority Japan Sept. 12, 1975), issued Dec. 12, 1978, entitled "Apparatus for Forming a Character by a Matrix Pattern of Picture Elements;" U.S. Pat. No. 4,107,664 to F. C. Marino, filed July 6, 1976, issued Aug. 15, 1978, entitled "Raster Scanned Display System;" IBM *Technical Disclosure Bulletin*, Vol. 21, No. 11, pages 4339–40 (April 1979), entitled "Text Editing Display System with Vertical Expansion of Selected Lines for Highlighting," by C. E. Boyd, K. R. Demke, and J. L. Mumola; and U.S. Pat. No. 4,168,489 to J. L. Ervin, filed Feb. 13, 1978, issued Sept. 18, 1979, entitled "Full Page Mode System for Certain Word Processing Devices."

One of the ongoing trends in cathode ray tube (CRT) text processing system displays has been an effort to increase the amount of text capable of being displayed at once on the display screen. This has been done in either or both of two ways. That is, a larger CRT can be used or the physical size of the characters can be decreased to allow more characters to be displayed in a given frame size. The utilization of larger tubes entails higher costs and power requirements for the display system. This is because of greater costs associated not only with the larger CRT but also with higher performance deflection circuitry to deflect the CRT beam longer distances within the larger CRT screen area at the same refresh rate. This higher performance circuitry also requires more electrical input power. On the other hand, if the size of the CRT is held constant and the physical sizes of the characters and symbols to be displayed are made smaller in an effort to display more characters per frame, the difficulty of comfortably reading the characters increases.

In some modes of operation such as initial key entry of text, it is considered acceptable from an operator standpoint to utilize characters having a rather small physical size, since the operator in this mode normally does not do a significant amount of reading from the screen. However, in proofreading or editing and correction applications, it is desirable to display characters of a much larger physical size even if this renders the display of a full page of text impossible.

In the above-referenced IBM *Technical Disclosure Bulletin* article by Boyd, Demke and Mumola it is taught to display characters in a font having twice the vertical dimension of the character size normally displayed, without any expansion in the horizontal direction. If this technique were used for all of the text in a frame it would, of course, halve the amount of text that could be displayed in the frame. A variation of this technique that has been proposed would employ the use of the shorter characters on most of the lines of a frame and the larger characters on the line including the cursor character as well as, perhaps, one or two lines above and below the line including the cursor character.

Although the above referenced IBM *Technical Disclosure Bulletin* shows a system with double high characters, the project development which lead to that publication used separate character generator memories for the short character font and the tall character font. Since it was necessary in the case of each double high character to store twice as many bits of video data representative of the pels of the character as was required for the shorter characters, the use of that technique lead to the total requirement of three times as many bits of character generator memory as was originally required for the shorter, single high character font.

The above-referenced IBM *Technical Disclosure Bulletin* article by Holderness teaches an example of using the same character generator for generation of two sizes of characters. The dimensions of the displayed characters are doubled in both the horizontal and vertical directions. U.S. Pat. Nos. 4,107,664 and 4,168,489 also teach other examples of expansion of the character patterns in both the horizontal and vertical directions from a single set of characters stored in a single character generator memory.

It is usually the case that when it is attempted to expand the size of a set of characters represented by a single character font for use in more than one size, the appearance of many of the characters becomes undesirable because of differences in the proportions of the characters after enlargement. The change in proportions occurs because the character is expanded only in the vertical axis and not in the horizontal axis. Since the aforementioned patents and Holderness publication expand in both axes, they do not suffer from this problem. But, when it is attempted to construct a double high character by simply providing pairs of vertically disposed pels for each single pel of the single high character, the proportions of the various segments of the character may have an unusual and unacceptable appearance. This makes reading difficult and increases the operator's error rate. Of course, one way to overcome this problem is to separately store two different character fonts in three times the amount of memory space as is required for the single high font and aesthetically style both fonts differently from each other to achieve a desirable appearance in both sizes. The cost disadvantage of this approach is immediately obvious, however, when consideration is given toward tripling the character generator memory size.

U.S. Pat. No. 4,129,860 addresses the problem of enlarging characters stored in a single character generator while maintaining a clear and pleasant appearance of the character. The solution proposed by this patent, however, involves a real time interpolation technique including a substantially extensive amount of hardware. Further, this solution involves expansion of the characters in both the vertical and horizontal axes. While this may be an appropriate solution for the general case in which a widely varying degree of magnification of the characters and symbols is required, it appears to be an expensive approach for a system requiring a small number, for example a pair, of character sizes.

Except for the Boyd, Demke, and Mumola publication, the other examples of prior art teach character expansion in the horizontal as well as vertical axes. This potentially reduces the number of characters that can be displayed on a given screen size by about twice the amount as that experienced when the characters are expanded in only the vertical axis. However, the technique selected by Boyd, Demke, and Mumola in expanding in only the vertical axis required two character generaters to achieve adequantely styled characters in both sizes.

It would therefore be highly desirable to provide a very simple technique to enable the display of single and double high characters having a pleasant appearance in both sizes with a single character generator and a minimum requirement of associated character size translation hardware to enable the generation of two different character sizes from the single character generator memory.

SUMMARY OF THE INVENTION

Accordingly, a method and system are provided for generating properly proportioned alphanumeric characters and symbols in a number of different vertical heights with a single character generator and a minimum of associated circuitry. A read-only memory stores, at separate addresses associated with the characters and symbols to be displayed, a plurality of bits of video data representative of the pels of the characters and symbols as they are displayed in the shortest of the selectable vertical heights. The bits are stored in the character generator such that vertical segments of diagonal portions of the characters and symbols include no more than two bits per vertical segment of the diagonal portions. The video data bits representative of the pels of circular portions of the symbols are stored in an arrangement to generate a substantially horizontally elongated, elliptical shape when the character or symbol is displayed in the shortest of the selectable number of heights. The number of diagonal portions of the characters is minimized in the storage of bits of video data representative of the pels of the characters and symbols. For characters having circular portions which meet vertically disposed portions, all of the curve or diagonal is eliminated in the circular portions at the ends thereof which join the vertically disposed portion. For representation of a single dot portion of one of the characters or symbols, such as a period, a pair of video data bits is stored in an arrangement to generate a pair of horizontally disposed pels on the display when the character or symbol is displayed in the shortest of the selectable number of vertical heights.

Characters and symbols are displayed in the shortest vertical height by selectively addressing the character generator memory at addresses associated with the characters to be displayed. The bits of video data representative of the pels of the characters are applied to the display device, as read from the character generator memory, on a one-for-one basis. For display of characters of double the minimum height each bit of video data representative of the pels of the characters and symbols to be displayed is applied to the display device twice during each display frame. Assuming a horizontally scanned display system is utilized, translation circuitry between the display controller and the character generator allows a single character generator memory to be utilized for multiple character heights by identical repetition of each horizontal scan line.

The foregoing and other objects, features, extensions, and advantages of the invention will be apparent from the following more particular description of preferred embodiments of the invention, as illustrated in the accompanying drawing.

BRIEF DESCRIPTION OF THE DRAWING

FIGS. 1 and 2 show examples of a marginally acceptable single high N which results in an improperly proportioned double high N when its height is doubled, while

FIGS. 5 and 6 show a properly proportioned single high small circle which, when doubled in height, results in an improperly proportioned double high small circle, while

FIGS. 9 and 10 show improper construction of a single high dot symbol, such as is used to dot an "i" or "j," while

FIG. 14 shows the improperly proportioned result of doubling the height of the single high character A shown in FIG. 13, while

DESCRIPTION OF THE PREFERRED EMBODIMENTS

This invention is directed to a technique for increasing the height of displayed characters and symbols in a properly proportioned manner by an integral multiple of the shortest character height which is stored in a single character generator memory. For the purposes of this description a character depicted in its shortest height is referred to as a single high character while a character depicted at twice its single height is referred to as a double high character or a two high character.

Figure 1:
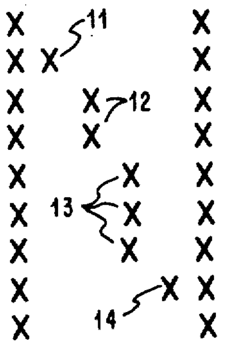

Referring now to FIG. 1, a single high N is shown. Each x of the N represents a single dot picture element (pel) as generated by unblanking the beam of a CRT raster display device for a single unit of time during a horizontal scan of the beam. The beam is caused to unblank during appropriate time units responsive to "unblank" video data bits stored in a character generator memory at an address associated with the character N. The diagonal portion of the N includes a plurality of segments of one or more vertically disposed pels denoted as segments 11-14. It is noted that segments 11 and 14 include a single pel, while segments 12 includes a pair of vertically aligned pels, and segment 13 includes three vertically aligned pels. This composition of the diagonal portion of the N is a reasonably proportioned approximation of the true diagonal.

Figure 2:
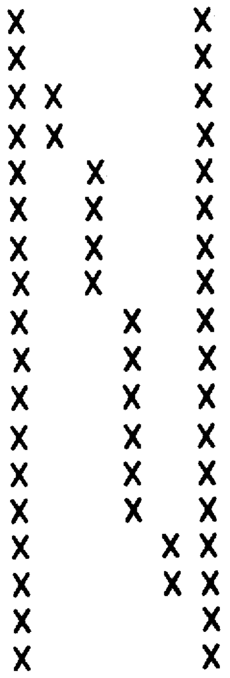

Referring to FIG. 2, however, the problem of enlarging the single high N of FIG. 1 into the double high N of FIG. 2 is immediately obvious. By providing an additional repetition of the pel content of each horizontal scan, segment 12 of the diagonal now contains four vertically aligned pels while segment 13 of the diagonal contains six vertically aligned pels.

Figure 3:
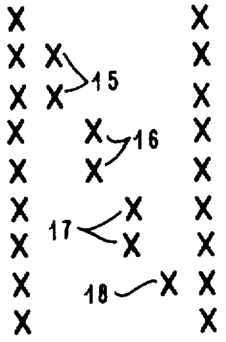
FIGS. 3 and 4 show examples of a properly proportioned single high and double high character N.
Figure 4:
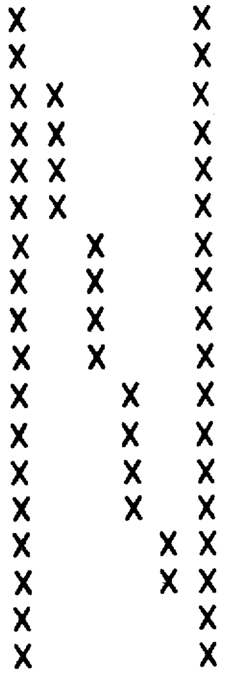

The N in FIG. 3, on the other hand, has been proportioned in accordance with the principles of this invention to provide an acceptable appearance in both the single high size, as shown in FIG. 3 and the two high size as shown in FIG. 4. Note that in FIG. 3 the diagonal portion of the N includes only two different sizes of vertical segments, as shown by reference numerals 15–18, rather than the three different sizes of vertical segments which are included in the diagonal portion of the N shown in FIG. 1. Upon doubling the height of the N in FIG. 3 to provide the double high N as shown in FIG. 4, segments 15–17 are expanded to include only four vertically aligned pels each. Thus, the N in FIG. 4 has far superior readability when compared to the double high N in FIG. 2. Accordingly, the rule for diagonal portions is that no vertical segment of a diagonal portion in the single high character stored in the character generator memory includes more than two video data bits representative of a pair of vertically aligned pels. Although the N has been used by way of example, other characters to which this rule applies include M, V, v, W, w, X, x, and $\phi$.

Figure 5:
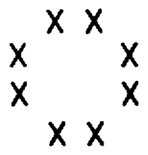

Referring to FIG. 5 a small circle is shown in the single high size which might be used, for example, as the degree symbol "°". Other symbols employing relatively small circular portions include A, , ∞, &, @.

Figure 6:
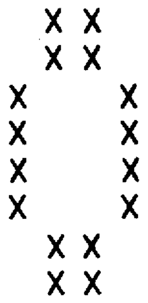
Figure 7:
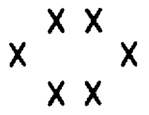
FIGS. 7 and 8 show examples of properly proportioned single high and double high small circles, such as the degree symbol.
Figure 8:
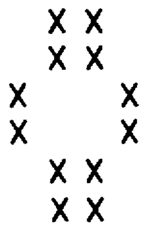

While the circular portion shown in FIG. 5 has a pleasant appearance, when each horizontally swept portion of the single high character is repeated once to produce the double high character shown in FIG. 6 the circular shape takes on a vertically elongated appearance that renders the reading thereof more difficult. The solution discovered for this problem is shown in FIG. 7, whereby the representation of the shape stored in the character generator produces an elliptically shaped circle elongated in the horizontal direction when the single high shape is displayed. When the double high shape is displayed, as shown in FIG. 8, the symbol of character portion is far more readable than the representation shown in FIG. 6. While the double high representation shown in FIG. 8 is far superior to the double high representation shown in FIG. 6, it will also be noted that the single high circular representation shown in FIG. 7 is perfectly readable and acceptable as a circular symbol or circular portion of a symbol.

Figure 9:
Figure 10:
Figure 11:
FIGS. 11 and 12 show properly proportioned single high and double high dot symbols.
Figure 12:

FIG. 9 shows the obvious single high representation of a dot for use as a period, or dot over a lower case i or j. In the double high representation of this, however, as shown in FIG. 10, the dot takes on an unpleasant vertically elongated appearance which makes its readability more difficult. This problem is corrected as shown in FIG. 11 for the single high case by constructing the dot from a pair of horizontally aligned pels. When the two high construction is generated from the representation shown in FIG. 11, the larger dot takes on a bolder and symmetrical appearance, as shown in FIG. 12, that substantially increases the readability thereof.

Figure 13:
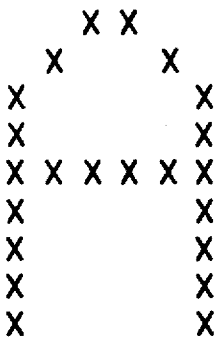
Figure 14:
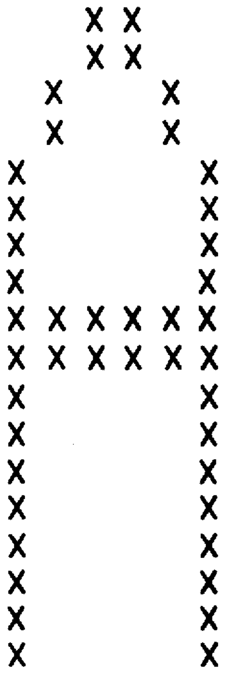

In FIG. 13 an A is shown in the single high height. This A has a reasonably proportioned appearance in the single high height. However, when the height of this character is doubled, as shown in FIG. 14, the diagonal portions of the character (an example of which is denoted by reference numeral 21 in FIG. 13) cause the character to have an unnecessarily jagged and pointed appearance which, again, renders reading more difficult and subjects the operator of the display to a higher probability of making errors when it is considered that such an operator might spend most of each work day in front of a screen filled with many examples of this type of character.

Figure 15:
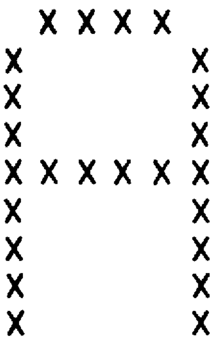
FIGS. 15 and 16 show examples of a properly proportioned single high and double high character A.
Figure 16:
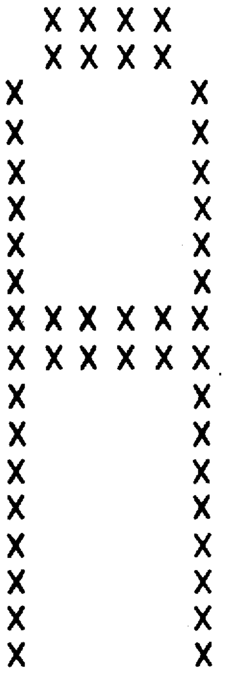

The solution discovered with the characters such as the example A shown in FIG. 13 is that in many characters it is unnecessary in the single high height to represent diagonal portions by more than two diagonally displaced pels. The problem with the A in FIG. 13, therefore, is that the diagonal portion 21 includes three diagonally displaced pels. Referring to FIG. 15 it is noted that the diagonal portions 22 and 23 of the single high A include only two diagonally displaced pels. When this character is translated and constructed as a double high character as shown in FIG. 16, the increased readability thereof is immediately apparent. Other characters to which this concept applies are w and y. It will also be noted that while the appearance of the double high A shown in FIG. 16 is far more readable and, therefore, far superior to the double high A shown in FIG. 14, the single high A of FIG. 15 has a totally readable and acceptable appearance.

The improvement made to the A described above involves making characters as boxy as possible in their single high heights. This concept is applied to the letters, b, d, g, h, n, p, q, and u, by elimination of all curve or diagonal in the horizontally disposed curved segments at the ends of these segments which meet the vertically disposed segments of the characters.

Figure 17:
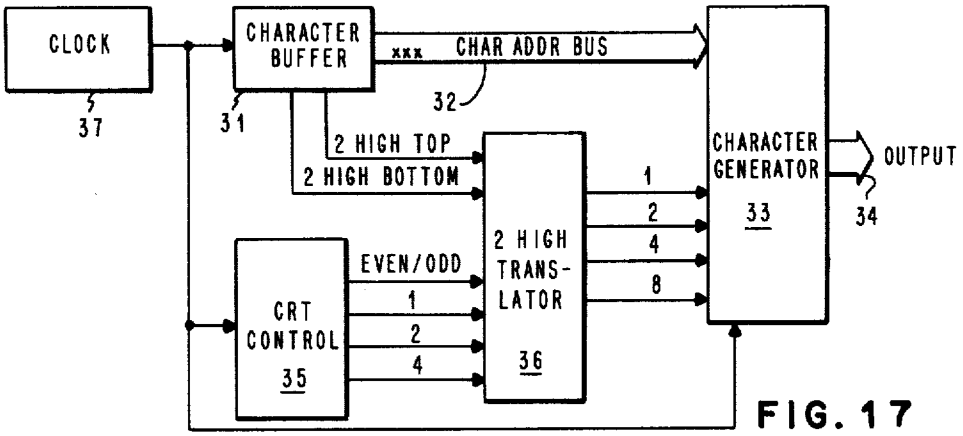
FIG. 17 shows a block diagram of a display system employing the character generator and double high translator of this invention.

Referring now to FIG. 17 a block diagram of a display system employing the character generator and two high translator of this invention is shown. Alphanumeric characters and symbols to be displayed within a frame of a raster display CRT system are stored in a character buffer 31. The binary codes stored in the character buffer 31 are addresses corresponding to individual characters and symbols stored in character generator 33 to be displayed. The character buffer 31 is typically a random access memory which is written into by a host system, not shown, with the codes desired to be displayed. The character address codes stored in buffer 31 are conveyed along a character address bus 32 to the character generator 33.

Figure 19:
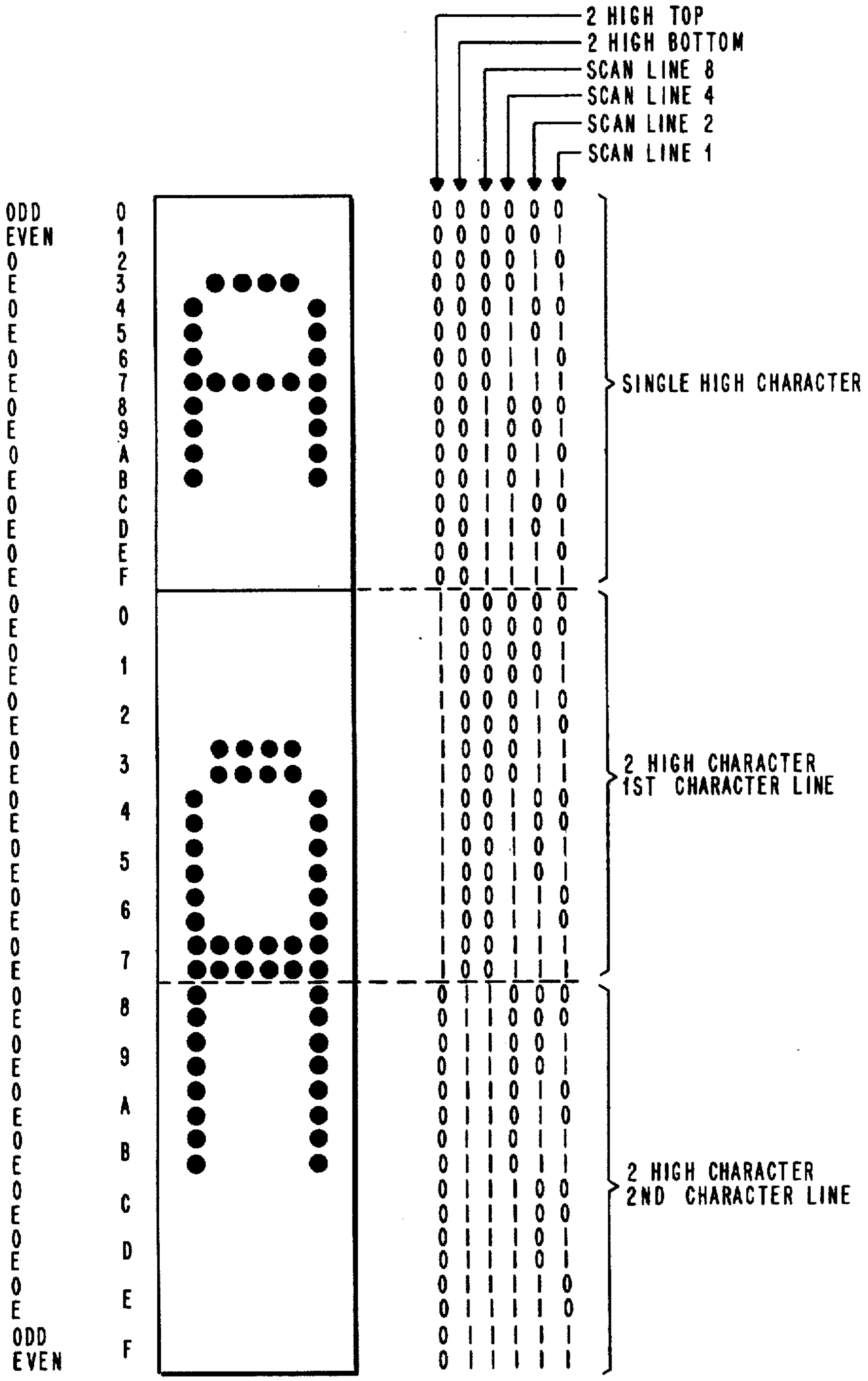
FIG. 19 shows the pel construction and scan line addressing of a single high and double high A as generated by the character generator of this invention.

The character generator 33 is a memory device which is typically a read-only memory, although the character generator 33 could be a random access memory loaded with video bits in accordance with the principles of this invention. The character generator 33 stores bits of video data representative of the pels of the characters which are to be displayed by the display device. In a horizontally scanned raster display system it is necessary to address the same character a plurality of times, once for each horizontal scan line of the character box. Referring to FIG. 19, it will be noted that for the purposes of this description the character box is shown to be 16 scan lines high. For the single high character the first three scan lines are totally blank as are the last four scan lines. This provides vertical spacing of the horizontal lines of text and symbols on the display screen. Thus, from this observation in FIG. 19 it will be noted that the character generator 33 is addressed 16 times along the character address bus 32 for each character to be displayed.

The CRT control logic 35 is operative to direct the addressing within the character generator to the appropriate one of the 16 scan lines of the video data bits representative of the horizontal scan lines of the pels of the characters to be constructed. The CRT control logic 35 may be, for example, an integrated circuit module such as the Motorola 6845 CRT controller. This controller is operable to provide the well known interlaced scanning operation wherein all of the odd scans take place alternated by all of the even scans interlaced therebetween. For the purposes of this description interlaced scanning will be assumed although the circuitry is operative in a progressive scanning mode and the Motorola 6845 CRT controller is also operative in the progressive scan mode. Operations of the character buffer 31, the CRT control logic 35, and the character generator 33 are synchronized by a clock signal from clock 37.

Figure 18:
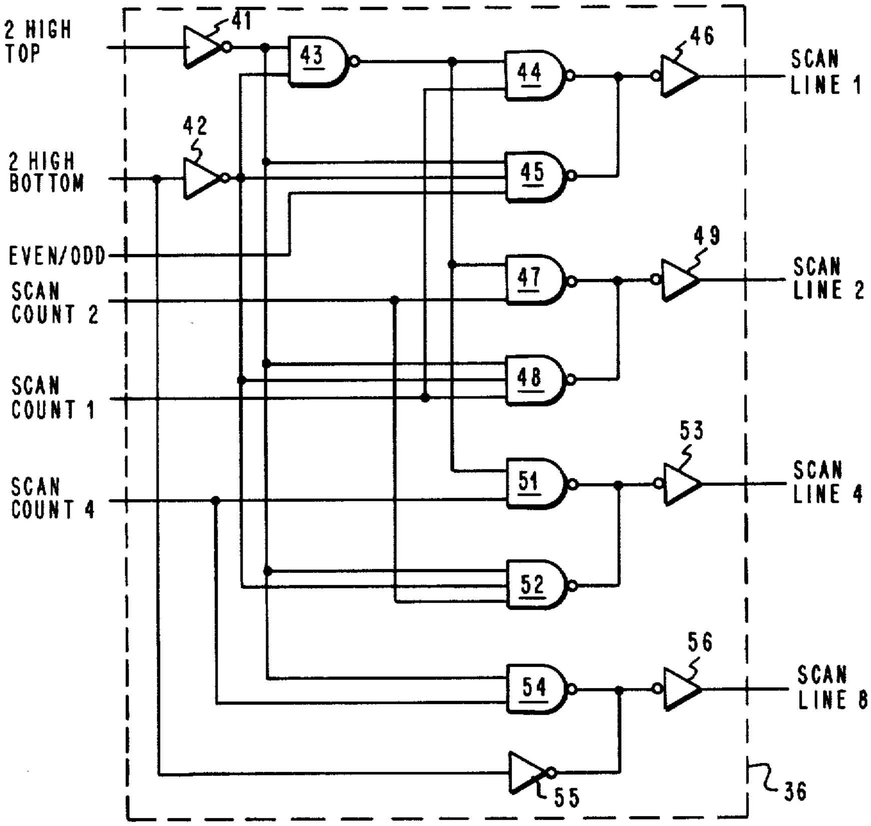
FIG. 18 is a detailed logic depiction of the double high translator of FIG. 17.

The two high translator 36, shown in more detail and described hereinafter relative to FIG. 18, is operative to convert the construction of a single high character stored in character generator 33 to a double high character output from generator 33. For the single high characters and symbols the translator 36 performs no transformation in the EVEN/ODD, 1, 2, and 4 scan line output signals from the CRT control logic 35. In the single high character or symbol, these output signals from CRT control logic 35 are conveyed along the scan line output conductors 1, 2, 4, and 8, respectively, from the translator 36 to the character generator memory 33.

The construction of one or more two high characters or symbols is commanded by attribute data bits associated with the individual characters and symbols or entire lines of characters and symbols. This arrangement can be implemented in a variety of ways and the choice of implementation is unimportant relative to the operation of this invention. For example, each character and symbol coded stored in character buffer 31 could include an attribute field of two additional bits to denote that the character is to be displayed as a single high character (both attribute bits zero), as the top half of a double high character or symbol (2 HIGH TOP attribute bit one and 2 HIGH BOTTOM attribute bit zero), or the bottom half of a double high character (2 HIGH TOP attribute bit zero and 2 HIGH BOTTOM attribute bit one). Alternatively, an entire attribute byte might be associated with each character and physically stored in a separate memory synchronized with the operation of the character buffer 31. Another implementation would be to include attribute bytes which would affect an entire line of text as a whole, rather than individual characters of the line. In any case, for the understanding of this system, it is necessary only to understand that characters are displayed in their normal, single high height by conventional operation of the system.

By way of example, to display whole lines of characters and symbols in their two high height, each line of characters and symbols is loaded into the character buffer 31 as an identical pair of lines of codes representative of the character generator 33 addresses of the characters and symbols to be displayed. The only difference between the first and second line of the pair of lines of codes in the character buffer 31 is that the first line of the pair has a 2 HIGH TOP attribute bit set to one and a 2 HIGH BOTTOM attribute bit set to zero, while the second of the pair of lines has the 2 HIGH TOP attribute bit set to zero and the 2 HIGH BOTTOM attribute bit set to one. As the character generator 33 receives addresses relative to the characters in the first of the pair of lines, the two high translator 36 is conditioned by the 2 HIGH TOP attribute bit which is set to one such that the first eight of the 16 horizontal scan lines of the character are applied twice each to the video circuitry of the display. When the same character in the second of the identical pair of lines stored in the character buffer 31 addresses the character generator 33, the two high translator 36 responds to the 2 HIGH BOTTOM attribute bit set to one to cause the second eight scan lines of the character addressed in character generator 33 to be transmitted to the video circuitry twice for each of the scan lines. Again, this is shown in FIG. 19.

Referring to FIG. 18 the operation of the two high translator 36 will be described. As described above, for single high characters the two high translator circuit 36 performs no transformation from the output signals of the CRT control logic 35. That is, with both the 2 HIGH TOP and 2 HIGH BOTTOM attribute bits set to zero the EVEN/ODD input signal to translator 36 is gated through NAND gate 45 and output from inverter 46 as the SCAN LINE 1 signal in the same state as its input state. With both attribute bits set to zero the SCAN COUNT 1 signal is gated through NAND gate 48 and output from inverter 49 as the SCAN LINE 2 signal in the same state as its input state. Similarly, the SCAN COUNT 2 signal is gated through NAND gate 52 and output from inverter 53 as the SCAN LINE 4 signal in the same state as its input state, and the SCAN COUNT 4 signal is gated through NAND gate 54 and is output from inverter 56 as the SCAN LINE 8 signal in the same state as its input state.

When either of the 2 HIGH TOP or 2 HIGH BOTTOM attribute bits are a logical one (both are never a logical one simultaneously) these signals are applied through inverters 41 and 42, respectively to produce a logical one output from NAND gate 43 which is applied to inputs of NAND gates 44, 47, and 51. In accordance with the same 16 combinations of input states on the input lines of translator 36, the output lines thereof generate 16 output states. When the 2 HIGH TOP attribute bit is a logical one the 16 output states are eight pairs of each binary count from zero through seven. When the 2 HIGH BOTTOM attribute bit is a logical one the output states are eight pairs of each binary count from eight through fifteen. This provides for the addressing of each scan line in the character generator twice to produce the double high characters.

It will be noted that if the input lines to the translator 36 were relabelled SCAN COUNT 1 rather than EVEN/ODD, SCAN COUNT 2 rather than SCAN COUNT 1, SCAN COUNT 4 rather than SCAN COUNT 2, and SCAN COUNT 8 rather than SCAN COUNT 4, respectively, the identical translator circuit would operate in a progressive scanning system rather than an interlaced scanning system.

In summary a method and system have been shown for generating properly proportioned alphanumeric characters and symbols in two vertical heights with a single character generator and a minimum of associated circuitry. The bits of video data stored in the character generator are stored such that the vertical segments of diagonal portions of the characters and symbols include no more than two bits per vertical segment of the diagonal portion. The video data bits representative of the pels of circular portions of the symbols are stored in an arrangement to generate a substantially elliptical shape when the character or symbol is displayed in the shorter of the two heights. Whenever possible, the diagonal portions of characters and symbols include no more than two diagonally disposed pels in the single high character size. For characters having circular portions which meet vertically disposed portions, all of the curve or diagonal is eliminated in the circular portion at the ends thereof which join the vertically disposed portions. For representation of a single dot portion of on of the characters or symbols, a pair of video data bits is stored to generate a pair of horizontally disposed pels on the display when the character or symbol is displayed in the shorter of the two vertical heights. Translation logic has been shown and described to efficiently provide for two sizes of characters with a minimum of additional hardware and with no additional character generator memory beyond that required for single high characters.

While the invention has been shown and described with reference to particular embodiments thereof, it will be understood by those skilled in the art that the foregoing or other changes in form and detail may be made therein without departing from the spirit and scope of the invention.

What is claimed is:

1. A method of generating alphanumeric characters and symbols in a number of different vertical heights on a display device, comprising:

storing in a memory at separate addresses associated with said characters and symbols, a plurality of bits of video data representative of the pels of said characters and symbols to be displayed in the smallest of said number of sizes, said storing being limited to include no more than two bits representative of vertically aligned pels in a segment of a diagonal portion of said character;

applying said data stored by each of said bits to said display device for display of said characters and symbols in the lowest of said vertical heights; and applying said data stored by each of said bits a multiple number of times in each display frame to said display device for display of said character in a taller of said number of vertical heights.

2. The method of claim 1 wherein said step of storing in a memory further includes for representation of a plurality of data bits representative of a substantially circular portion of one of said symbols, a plurality of video data bits arranged to generate a substantially elliptically shape portion of said symbol when said symbol is displayed in said shortest of said heights, said elliptical shape being elongated in a horizontal axis.

3. The method of claim 2 wherein said step of storing in a memory is further limited to include for representation of a single dot portion of one of said characters or symbols, a pair of video data bits arranged to generate a pair of horizontally disposed dots when said character or symbol is displayed in said shortest of said vertical heights.

4. The method of claim 2 wherein said step of storing in a memory further includes for representation of each diagonal portions of an A, w, n, y, a plurality of video data bits arranged to generate a number of vertically disposed pels and two diagonally displaced pels.

5. The method of claim 2 wherein said step of storing in a memory further includes for representation of a lower case character having a circular portion, said circular portion having ends thereof which meet a vertically disposed portion of said character, a plurality of video data bits arranged to generate a number of horizontally disposed pels which join a vertically disposed column of pels forming a segment of said character.

6. A system for generating alphanumeric characters and symbols of a number of vertical heights on a display device, comprising:

means for storing in a memory at an address associated with one of said characters a plurality of bits of video data representative of the pels of said characters and symbols to be displayed in the shortest of said number of vertical heights, said bit stored in said memory being limited to include no more than two bits representative of vertically aligned pels in a segment of a diagonal portion of said characters and symbols;

means for applying said data stored by each of said bits to said display device for display of said character in the shortest of said vertical heights; and means for applying said data stored by each of said bits a multiple number of times in each display frame to said display device for display of said characters and symbols in a taller of said vertical sizes.

7. The system of claim 4 wherein said bits of video data representative of the pels of said characters and symbols stored in said memory include for representation of a plurality of bits representative of a substantially circular portion of said symbols, a plurality of bits arranged to generate a substantially elliptically shaped portion of said symbol when said symbol is displayed in said shortest of said vertical heights, said elliptical shape being elongated in a horizontal axis.

8. The system of claim 5 wherein said display device is a cathode ray tube display device.

9. The system of claim 6 wherein said means for storing in a memory includes a first read-only memory.

10. The system of claim 9 further comprising a second random access memory means for storing addresses associated with said characters and symbols; and means for reading the addresses stored in said second memory for accessing the associated characters in said first memory for display.

* * * * *